(12) United States Patent
Shi et al.

(10) Patent No.: US 12,084,178 B2
(45) Date of Patent: Sep. 10, 2024

(54) INSECT-LIKE JUMPING-FLYING ROBOT

(71) Applicant: Beijing Institute of Technology, Beijing (CN)

(72) Inventors: Qing Shi, Beijing (CN); Yi Xu, Beijing (CN); Ruochao Wang, Beijing (CN); Guanglu Jia, Beijing (CN); Tao Sun, Beijing (CN)

(73) Assignee: Beijing Institute of Technology, Beijing (CN)

( * ) Notice: Subject to any disclaimer, the term of this patent is extended or adjusted under 35 U.S.C. 154(b) by 515 days.

(21) Appl. No.: 17/487,055

(22) Filed: Sep. 28, 2021

(65) Prior Publication Data
US 2023/0017118 A1 Jan. 19, 2023

(30) Foreign Application Priority Data
Jul. 19, 2021 (CN) .......................... 202110813092.5

(51) Int. Cl.
*A63H 27/00* (2006.01)
*B62D 57/02* (2006.01)
(Continued)

(52) U.S. Cl.
CPC ............ *B64C 39/003* (2013.01); *B62D 57/02* (2013.01); *B62D 57/04* (2013.01); *B64C 3/38* (2013.01);
(Continued)

(58) Field of Classification Search
CPC ........ B64U 60/50; B64U 60/55; B64U 10/20; B62D 57/02; B62D 57/04; B64C 3/38; B64C 3/385; B64C 25/62; B64C 2025/008; B64C 39/003; A63H 27/008; A63H 27/12; A63H 29/22
(Continued)

(56) References Cited

U.S. PATENT DOCUMENTS 6,082,671 A * 7/2000 Michelson ............ B64C 39/028
249/11
6,632,119 B2 * 10/2003 Chernek ................ A63H 29/18
244/72
(Continued)

FOREIGN PATENT DOCUMENTS

CN 101734299 A * 6/2010
CN 102923303 A * 2/2013
(Continued)

*Primary Examiner* — Alexander R Niconovich
(74) *Attorney, Agent, or Firm* — INNOVAR, L.L.C.; Rick Matos

(57) ABSTRACT

An insect-like jumping-flying robot is provided, which includes a flying module, a driving module and biomimetic bouncing legs. The flying module provides flying power via a propeller and a miniature model airplane motor, and front wings and rear wings provide lift, and moment required for attitude change. The driving module provides power with high power density via a brushless motor and is provided with two stages of deceleration to amplify the torque provided by the brushless motor. The first stage of deceleration is performed by a synchronous wheel set, and the second stage of deceleration is performed by a gear set. A driving push rod is used to transmit the power provided by the brushless motor to the biomimetic bouncing legs.

1 Claim, 2 Drawing Sheets

(51) Int. Cl.
  *B62D 57/04*   (2006.01)
  *B64C 3/38*    (2006.01)
  *B64C 11/00*   (2006.01)
  *B64C 25/62*   (2006.01)
  *B64C 39/00*   (2023.01)
  *B64C 39/08*   (2006.01)
  *B64D 27/24*   (2006.01)
  *B64U 10/20*   (2023.01)
  *B64U 60/50*   (2023.01)
  *B64U 60/55*   (2023.01)
  *B64C 25/00*   (2006.01)

(52) U.S. Cl.
  CPC .............. *B64C 3/385* (2013.01); *B64C 11/00* (2013.01); *B64C 25/62* (2013.01); *B64C 39/08* (2013.01); *B64D 27/24* (2013.01); *B64U 10/20* (2023.01); *B64U 60/50* (2023.01); *B64U 60/55* (2023.01); *B64C 2025/008* (2013.01)

(58) Field of Classification Search
  USPC .............. 446/34, 35, 36, 37, 57, 58; 244/11, 244/17.17, 72
  See application file for complete search history.

(56) References Cited

U.S. PATENT DOCUMENTS

| | | | | |
|---|---|---|---|---|
| 8,308,522 B2* | 11/2012 | Van de Rostyne | .... | A63H 27/06 244/17.23 |
| 8,342,440 B2* | 1/2013 | Papanikolopoulos | ...... | A63H 27/12 244/17.11 |
| 8,366,506 B2* | 2/2013 | Hwang | ........... | A63H 27/008 446/454 |
| 8,382,546 B2* | 2/2013 | Van Ruymbeke | ... | A63H 27/008 244/22 |
| 8,888,551 B2* | 11/2014 | Xu | ........... | A63H 27/12 244/17.23 |
| 9,072,981 B2* | 7/2015 | Tanous | ........... | A63H 27/008 |
| 9,533,234 B2* | 1/2017 | Tanous | ........... | A63H 27/008 |
| 9,731,816 B2* | 8/2017 | Harris, III | ........... | B64C 29/0025 |
| 9,802,137 B2* | 10/2017 | Yang | ........... | A63H 27/008 |
| 10,202,188 B2* | 2/2019 | del Castillo | ........... | B64D 1/22 |
| 10,253,855 B2* | 4/2019 | Potter | ........... | B62D 57/032 |
| 10,632,804 B2* | 4/2020 | Braithwaite | ........... | B33Y 80/00 |
| 11,241,787 B2* | 2/2022 | Shi | ........... | B25J 9/1065 |
| 11,760,478 B2* | 9/2023 | Hoshide | ........... | B64D 1/22 244/2 |
| 2013/0206921 A1* | 8/2013 | Paduano | ........... | B64C 29/02 244/7 C |
| 2023/0001757 A1* | 1/2023 | Ramezani | ........... | B64C 25/32 |
| 2023/0017118 A1* | 1/2023 | Shi | ........... | B64U 70/00 |

FOREIGN PATENT DOCUMENTS

| | | | | | |
|---|---|---|---|---|---|
| CN | 106184445 A | * | 12/2016 | | |
| CN | 106956727 A | * | 7/2017 | .............. | B62D 57/02 |
| CN | 107128385 A | * | 9/2017 | .............. | B62D 57/02 |
| CN | 108394484 A | * | 8/2018 | .............. | B62D 57/02 |
| CN | 108860596 A | * | 11/2018 | .............. | B64C 33/02 |
| CN | 109573019 A | * | 4/2019 | | |
| CN | 112109818 A | * | 12/2020 | .......... | B62D 57/032 |
| CN | 108750104 B | * | 5/2021 | .............. | B64C 33/02 |
| CN | 113184170 A | * | 7/2021 | .............. | B64C 25/32 |
| CN | 113184171 A | * | 7/2021 | .............. | B64C 25/32 |
| CN | 113428249 A | * | 9/2021 | | |
| CN | 114212159 A | * | 3/2022 | | |
| CN | 114248918 A | * | 3/2022 | .............. | B64C 33/02 |
| CN | 114455071 A | * | 5/2022 | | |
| CN | 115320739 A | * | 11/2022 | | |
| CN | 117120217 A | * | 11/2023 | .............. | B25J 5/00 |

* cited by examiner

INSECT-LIKE JUMPING-FLYING ROBOT

CROSS REFERENCE TO RELATED APPLICATION

This patent application claims the benefit and priority of Chinese Patent Application No. 202110813092.5 filed on Jul. 19, 2021, the disclosure of which is hereby incorporated by reference herein in its entirety as part of the present application.

TECHNICAL FIELD

The present disclosure relates to the technical field of biomimetic robots, in particular to an insect-like jumping-flying robot.

BACKGROUND ART

Motion modes such as jumping or flying may have much more flexibility than traditional walking and crawling gaits, which greatly improves the adaptability of a robot to complex environments. However, at the present stage, the miniature jumping robot has problems such as a single motion mode, insufficient bionicity, and a low integration level. As for these problems, it is necessary to propose a robot of biomimetic insects, and the robot has the high integration level and multiple motion modes in the case of a small scale thereof.

SUMMARY OF THE INVENTION

The purpose of the present disclosure is to solve the problem of poor environmental adaptability of the existing miniature jumping robots; and a small scale, highly integrated, multi-modal insect-like jumping-flying robot is provided.

In order to achieve the above objective, some embodiments provides the following solutions: the present disclosure provides an insect-like jumping-flying robot, including a flying module, a driving module and a biomimetic bouncing leg.

The flying module includes a propeller, a miniature model airplane motor, front wings, rear wings, and a supporting frame; the propeller is mounted on the miniature model airplane motor; the miniature model airplane motor is mounted on a front end of the supporting frame; the front wings and the rear wings are mounted on the supporting frame through a first shafting and are configured to rotate around their respective mounting shafts of the first shafting.

The driving module includes a brushless motor, a gear fixed plate, a motor fixed plate, a synchronous wheel fixed plate, a synchronous wheel set, a gear set, a driving push rod and a body connecting plate; the brushless motor is fixed on the motor fixed plate via first screws, the synchronous wheel set includes a first synchronous wheel, a second synchronous wheel and a synchronous belt, the first synchronous wheel is mounted on an output shaft of the brushless motor, the second synchronous wheel is mounted on the synchronous wheel fixed plate via a first bearing, the first synchronous wheel is in transmission connection with the second synchronous wheel by the synchronous belt; the gear set includes a first gear and a second gear, the first gear is fixedly connected with an extension shaft of the second synchronous wheel; the second gear is fixed to the gear fixed plate via a second bearing, and the first gear is meshed with the second gear; the gear fixed plate, the motor fixed plate, and the synchronous wheel fixed plate are connected to the body connecting plate via second screws; a front end of the body connecting plate is connected to the supporting frame, and another two ends of the body connecting plate are symmetrically installed with biomimetic bouncing legs; the driving push rod is fixedly connected with the second gear, and functions as an output end of a transmission chain to act on the biomimetic bouncing legs.

Each of the biomimetic bouncing legs includes a femur driving rod, a first connecting rod of a femur upper X-shaped rod group, a second connecting rod of the femur upper X-shaped rod group, a femur lower connecting rod, a knee joint, a tibia connecting rod, a leg fixed bracket, a tarsus, and a force accumulating spring; the femur driving rod is connected to a shaft hole on an upper side of the leg fixed bracket via a second shafting and is fixed via a first circlip; the first connecting rod of the femur upper X-shaped rod group is connected with a first end of the femur driving rod via a third shafting and is fixed via a second circlip; the second connecting rod of the femur upper X-shaped rod group is connected with a second end of the femur driving rod via a third screw; a first end of the femur lower connecting rod is connected with a shaft hole on a lower side of the leg fixed bracket, and a second end of the femur lower connecting rod is provided with two shaft holes respectively connected to the first connecting rod of the femur upper X-shaped rod group and the knee joint; the knee joint is provided with mounting holes, a first end of the force accumulating spring, the second connecting rod, the femur lower connecting rod, and the tibia connecting rod are separately connected with the mounting holes from up to down; a tip end of the tibia connecting rod and the tarsus are connected via a fourth shafting and fixed via a third circlip; the first end of the force accumulating spring is connected to the knee joint, and a second end of the force accumulating spring is connected to a mounting hole on the first connecting rod.

Compared with the prior art, some embodiments achieve the following beneficial technical effects: The insect-like jumping-flying robot in the present disclosure improves the adaptability of the robot to complex environments, where the robot has motion modes with multiple attitudes, and has a high integration level.

BRIEF DESCRIPTION OF THE DRAWINGS

In order to illustrate the embodiments of the present disclosure or the technical solutions in the prior art more clearly, the drawings needed in the embodiments will be briefly introduced hereinafter. Apparently, the drawings in the following description are only some embodiments of the present disclosure. For those skilled in the art, other drawings can be obtained according to these drawings without paying creative labor.

Figure 1:
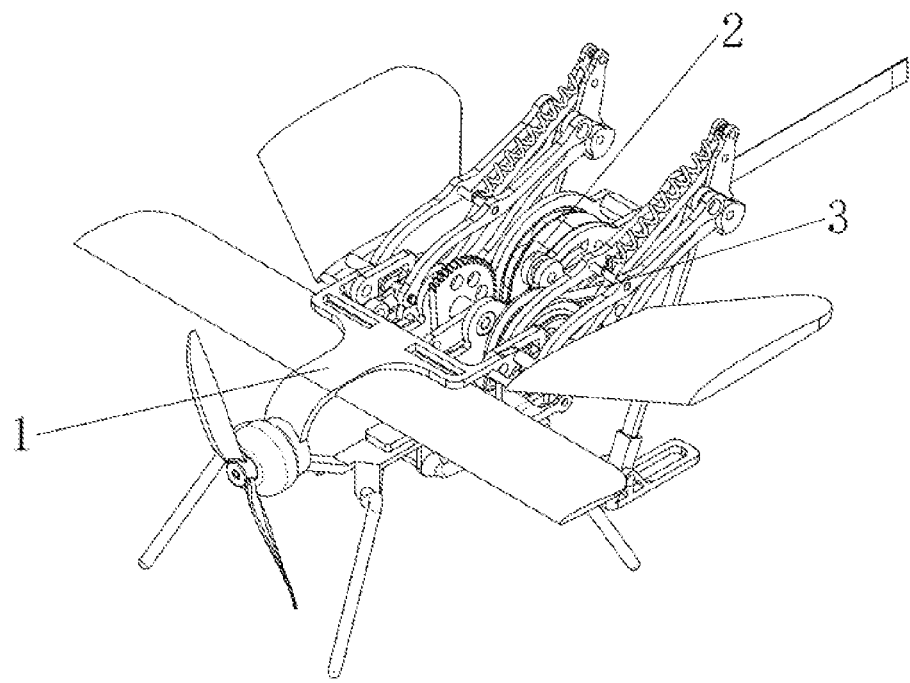
FIG. 1 is a schematic diagram of an overall structure of an insect-like jumping-flying robot.

List of reference numerals: 1 flying module; 101 propeller; 102 miniature model airplane motor; 103 front wing; 104 rear wing; 105 supporting frame;

2 Driving module; 201 brushless motor; 202 gear fixed plate; 203 motor fixed plate; 204 synchronous wheel fixed plate; 205 synchronous wheel set; 206 gear set; 207 driving push rod; 208 body connecting plate;

3 Biomimetic bouncing leg; 301 femur driving rod; 302 first connecting rod of a femur upper X-shaped rod group; 303 second connecting rod of the femur upper X-shaped rod group; 304 femur lower connecting rod; 305 knee joint; 306 tibia connecting rod; 307 leg fixed bracket; 308 tarsus; 309 force accumulating spring.

DETAILED DESCRIPTION OF THE EMBODIMENTS

The technical solutions in the embodiments of the present disclosure will be described clearly and completely hereinafter with reference to the drawings of the embodiments of the present disclosure. Apparently, the described embodiments are some embodiments of the present disclosure, rather than all of the embodiments. Based on the embodiments of the present disclosure, all other embodiments obtained by those skilled in the art without paying creative labor fall in the scope of protection of the present disclosure.

The purpose of the present disclosure is to solve the problem of poor environmental adaptability of the existing miniature jumping robots; and a small-scale, highly integrated, multi-modal insect-like jumping-flying robot is provided.

In order to make the above objects, features and advantages of the present disclosure more obvious and understandable, the present disclosure will be further explained in detail hereinafter with reference to the drawings and specific embodiments.

Figure 2:
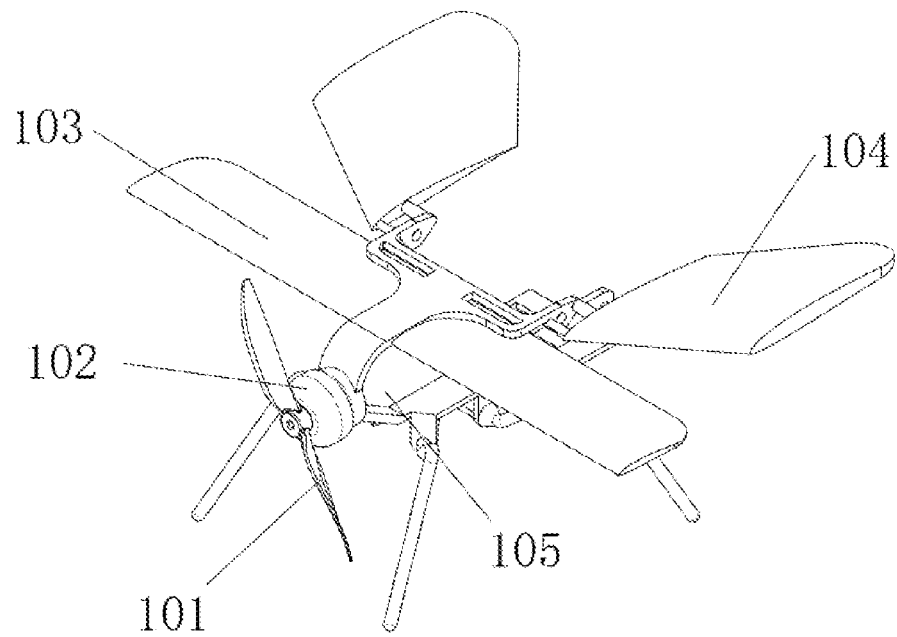
FIG. 2 is a structural schematic diagram of a flying module.
Figure 3:
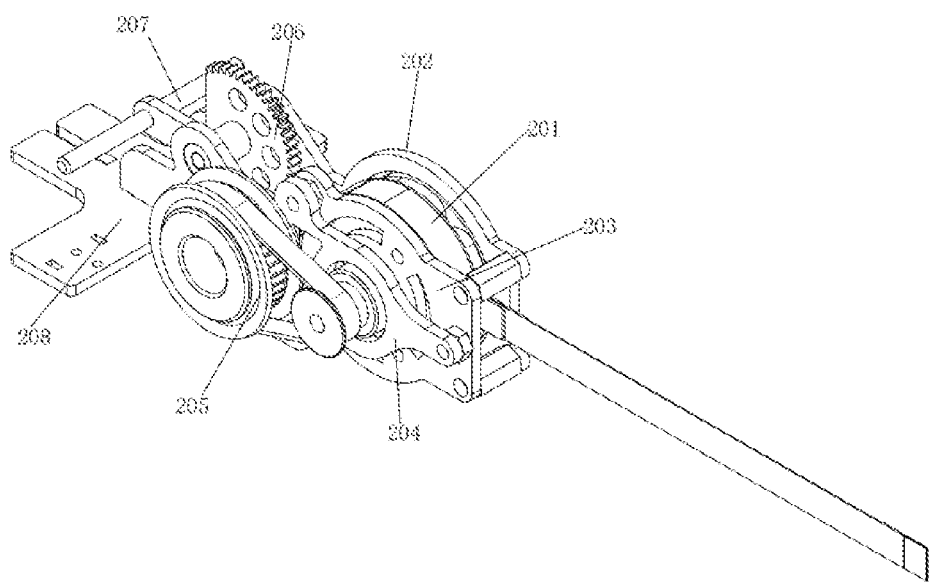
FIG. 3 is a structural schematic diagram of a driving module.
Figure 4:
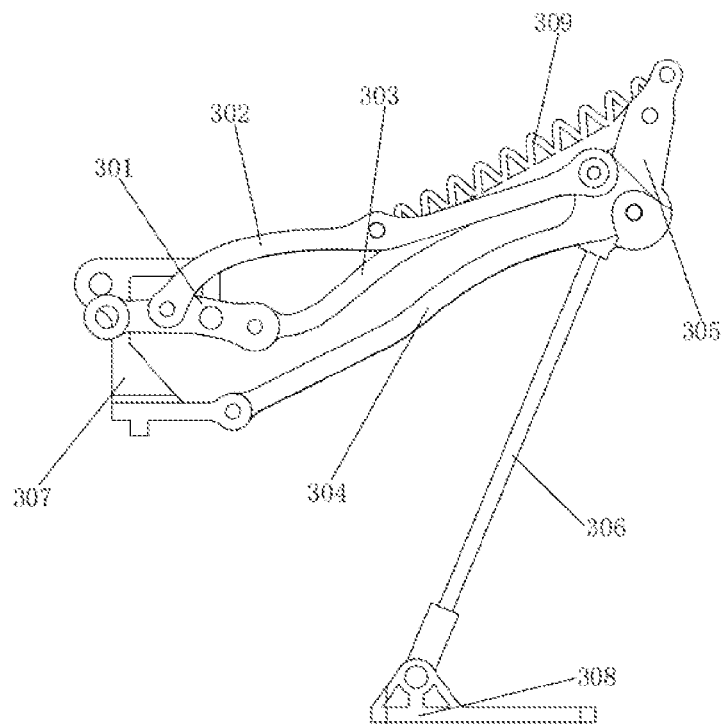
FIG. 4 is a structural schematic diagram of a biomimetic bouncing leg.

As shown in FIGS. 1-4, an embodiment provides an insect-like jumping-flying robot, which includes a flying module 1, a driving module 2, and two biomimetic bouncing legs 3.

The flying module 1 includes a propeller 101, a miniature model airplane motor 102, front wings 103, rear wings 104, and a supporting frame 105. The propeller 101 is mounted on the miniature model airplane motor 102; the miniature model airplane motor 102 is mounted on a front end of the supporting frame 105; the front wings 103 and the rear wings 104 are mounted on the supporting frame 105 through a shafting and can rotate around their respective mounting shafts of the shafting.

The driving module 2 includes a brushless motor 201, a gear fixed plate 202, a motor fixed plate 203, a synchronous wheel fixed plate 204, a synchronous wheel set 205, a gear set 206, a driving push rod 207, and a body connecting plate 208.

The brushless motor 201 is fixed on the motor fixed plate 203 via screws; the synchronous wheel set 205 includes a first synchronous wheel, a second synchronous wheel which has more teeth than that of the first synchronous wheel, and a synchronous belt, where the first synchronous wheel is mounted on an output shaft of the brushless motor 201, the second synchronous wheel is mounted on the synchronous wheel fixed plate 204 via a bearing, and the first synchronous wheel and the second synchronous wheel are transmitted motion by the synchronous belt. The gear set 206 includes a first gear and a second gear that is lager than the first gear, and the first gear is fixedly connected with an extension shaft of the second synchronous wheel to keep synchronous rotation of the first gear with the second synchronous wheel, the second gear is fixed to the gear fixed plate 202 via a bearing; the first gear is meshed with the second gear; the gear fixed plate 202, the motor fixed plate 203, and the synchronous wheel fixed plate 204 are connected to the body connecting plate 208 via screws. A front end of the body connecting plate 208 is connected to the supporting frame 105, another two ends of the body connecting plate 208 are symmetrically installed with biomimetic bouncing legs 3; the driving push rod 207 is fixedly connected with the second gear of the gear set to act on the biomimetic bouncing legs 3.

Each biomimetic bouncing leg 3 includes a femur driving rod 301, a first connecting rod of a femur upper X-shaped rod group 302, a second connecting rod of the femur upper X-shaped rod group 303, a femur lower connecting rod 304, a knee joint 305, a tibia connecting rod 306, a leg fixed bracket 307, a tarsus 308, and a force accumulating spring 309.

The femur driving rod 301 is connected to a shaft hole on an upper side of the leg fixed bracket 307 via a shaft and is fixed via a circlip; the first connecting rod 302 is connected with a first end of the femur driving rod 301 via a shafting and is fixed via a circlip; the second connecting rod 303 is connected with a second end of the femur driving rod 301 via a screw; a first end of the femur lower connecting rod 304 is connected with a shaft hole on a lower side of the leg fixed bracket 307, and a second end of the femur lower connecting rod 304 is provided with two shaft holes respectively connected to the first connecting rod 302 and the knee joint 305. The knee joint 305 is provided with mounting holes. A first end of the force accumulating spring 309, the second connecting rod 303, the femur lower connecting rod 304, and the tibia connecting rod 306 are respectively connected with the four mounting holes from up to down; a tip end of the tibia connecting rod 306 and the tarsus 308 are connected via a shafting and fixed via a circlip; a first end of the force accumulating spring 309 is connected to the knee joint 305, and a second end of the force accumulating spring 309 is connected to a mounting hole on the first connecting rod 302.

The working principle of the insect-like jumping-flying robot in the present disclosure is as follows.

The flying module 1 includes the propeller 101 and the miniature model airplane motor 102 to provide flying power, and the front wings 103 and the rear wings 104 provide lift, and moment required for attitude change. The two front wings 103 can rotate synchronously around their mounting shafts to provide pitching moment, and the two rear wings 104 can rotate differentially around their respective mounting shafts. That is, the two rear wings 104 can rotate in opposite directions to provide rolling moment. The supporting frame 105 is made of a metal with good toughness, which can play a buffering role when the robot descends.

The driving module 2 provides the power with high power density via the brushless motor 201 and is provided with two stages of deceleration to amplify the torque provided by the brushless motor 201. The first stage of the two stages of deceleration is performed by the synchronous wheel set 205, and the second stage of the two stages of deceleration is performed by the gear set 206. The driving push rod 207 is used to transmit the power provided by the brushless motor 201 to the biomimetic bouncing legs 3, so as to complete the power transmission. The body connecting plate 208 combines fixed plates together and is used to connect with other modules.

The biomimetic bouncing leg is designed based on the Stephenson six-bar mechanism, and a degree of freedom thereof is 1. By changing the lengths of the rods, the tip end of the mechanism can trace an approximately straight trajectory, so as to ensure that the takeoff trajectory of the robot is approximately a straight line. The knee joint 305 and the tibia connecting rod 306 are fixedly connected to form an integrated structure. The femur driving rod 301 is an active member. Under the constraints of the first connecting rod 302, the second connecting rod 303 and the femur lower connecting rod 304, it is ensured that the tip end of the tibia connecting rod 306 traces an approximately straight trajectory in the plane. The first end and the second end of the force accumulating spring 309 are respectively connected to the knee joint 305 and the first connecting rod 302; when the biomimetic bouncing legs 3 are in a folded state, the force accumulating spring 309 is stretched to store energy; when the bouncing legs 3 are stretched, the force accumulating spring 309 contracts to rapidly release energy to increase the bounce height.

It should be noted that for those skilled in the art, it is apparent that the present disclosure is not limited to the details of the above exemplary embodiments, and the present disclosure can be implemented in other specific forms without departing from the spirit or basic features of the present disclosure. Therefore, from any point of view, the embodiments should be regarded as exemplary and not limiting. The scope of the present disclosure is defined by the appended claims rather than the above description, and it is therefore intended that all variations belonging to the implication and scope of equivalents of the claims be included within the invention, and that no reference numerals in the claims should be regarded as limiting the related claims.

In this specification, specific embodiments aim to illustrate the principle and implementation of the present disclosure. The explanation of the above embodiments is only used to help understand the method and its core idea of the present disclosure. According to the idea of the present disclosure, there will be some changes in the specific implementation and application scope for those skilled in the art. To sum up, the contents of this specification should not be construed as limiting the present disclosure.

What is claimed is:

1. A jumping and flying robot having a shape of an insect, wherein the robot comprises
   a flying module comprising
      a propeller,
      a miniature model airplane motor,
      front wings,
      rear wings, and
      a supporting frame;
      wherein the propeller is mounted on the miniature model airplane motor; the miniature model airplane motor is mounted on a front end of the supporting frame; the front wings and the rear wings are mounted on the supporting frame through a first shafting and are configured to rotate around their respective mounting shafts of the first shafting;
   a driving module comprising
      a brushless motor,
      a gear fixed plate,
      a motor fixed plate,
      a synchronous wheel fixed plate,
      a synchronous wheel set,
      a gear set,
      a driving push rod, and
      a body connecting plate;
      wherein the brushless motor is fixed on the motor fixed plate via first screws, the synchronous wheel set comprises a first synchronous wheel, a second synchronous wheel and a synchronous belt, the first synchronous wheel is mounted on an output shaft of the brushless motor, the second synchronous wheel is mounted on the synchronous wheel fixed plate via a first bearing, the first synchronous wheel is in transmission connection with the second synchronous wheel by the synchronous belt; the gear set comprises a first gear and a second gear, the first gear is fixedly connected with an extension shaft of the second synchronous wheel; the second gear is fixed to the gear fixed plate via a second bearing, and the first gear is meshed with the second gear; the gear fixed plate, the motor fixed plate, and the synchronous wheel fixed plate are connected to the body connecting plate via second screws; a front end of the body connecting plate is connected to the supporting frame, and another two ends of the body connecting plate are symmetrically installed with biomimetic bouncing legs; the driving push rod is fixedly connected with the second gear to act on the biomimetic bouncing legs; and
   biomimetic bouncing legs, each comprising
      a femur driving rod,
      a first connecting rod of a femur upper X-shaped rod group,
      a second connecting rod of the femur upper X-shaped rod group,
      a femur lower connecting rod,
      a knee joint,
      a tibia connecting rod,
      a leg fixed bracket,
      a tarsus, and
      a force accumulating spring;
      wherein the femur driving rod is connected to a shaft hole on an upper side of the leg fixed bracket via a second shafting and is fixed via a first circlip; the first connecting rod of the femur upper X-shaped rod group is connected with a first end of the femur driving rod via a third shafting and is fixed via a second circlip; the second connecting rod of the femur upper X-shaped rod group is connected with a second end of the femur driving rod via a third screw; a first end of the femur lower connecting rod is connected with a shaft hole on a lower side of the leg fixed bracket, and a second end of the femur lower connecting rod is provided with two shaft holes respectively connected to the first connecting rod of the femur upper X-shaped rod group and the knee joint; the knee joint is provided with mounting holes, a first end of the force accumulating spring, the second connecting rod, the femur lower connecting rod, and the tibia connecting rod are separately connected with the mounting holes from up to down; a tip end of the tibia connecting rod and the tarsus are connected via a fourth shafting and fixed via a third circlip; the first end of the force accumulating spring is connected to the knee joint, and a second end of the force accumulating spring is connected to a mounting hole on the first connecting rod.

* * * * *